C. A. OLSEN.
DUST PAN.
APPLICATION FILED OCT. 2, 1917.
1,287,406.
Patented Dec. 10, 1918.
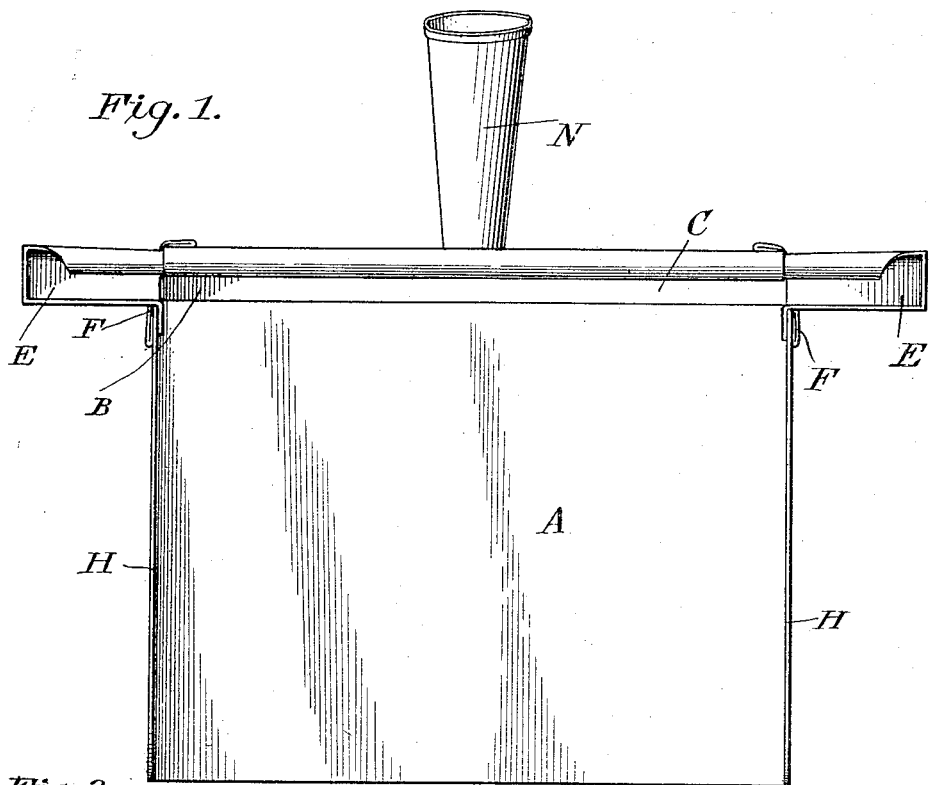
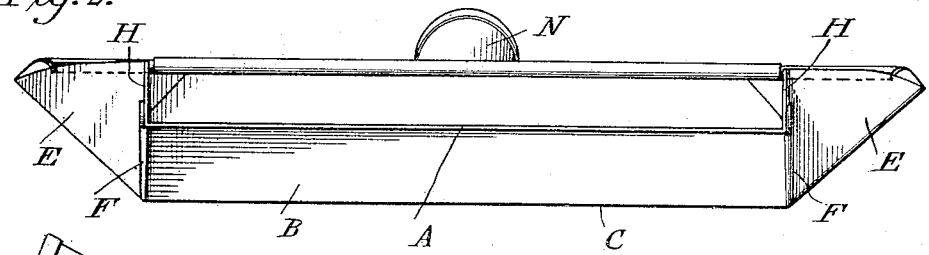
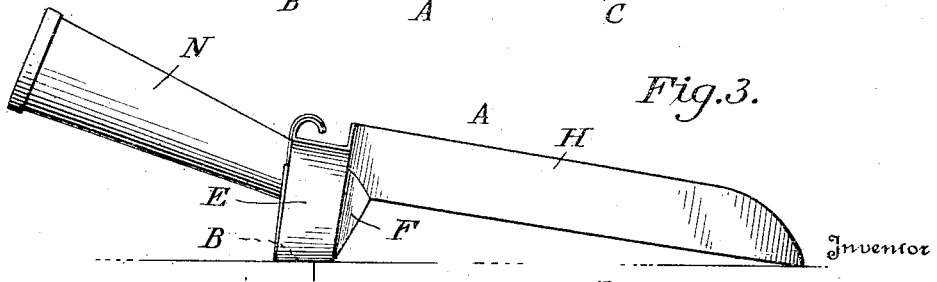
Witness
Fenton S Belt
A L Hough
Inventor
Clarence A. Olsen
By Frantch A Hough
Attorney

UNITED STATES PATENT OFFICE.

CLARENCE A. OLSEN, OF YANKTON, SOUTH DAKOTA.

DUST-PAN.

1,287,406.  Specification of Letters Patent.  Patented Dec. 10, 1918.

Application filed October 2, 1917. Serial No. 194,368.

*To all whom it may concern:*

Be it known that I, CLARENCE A. OLSEN, a citizen of the United States, residing at Yankton, in the county of Yankton and State of S. Dakota, have invented certain new and useful Improvements in Dust-Pans; and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in dust pans, and consists essentially in the provision of a pan having at the rear a trough with inclined ends, and which is adapted to receive the material brushed upon the pan, and forming means whereby the foreign matter may be emptied by tilting the pan in one direction or another.

The invention consists of various details of construction combinations and arrangements of parts, which will be hereinafter fully described, shown in the accompanying drawings and then specifically defined in the appended claim.

My invention is illustrated in the accompanying drawings which, with the letters of reference marked thereon, form a part of this specification and in which:

Figure 1 is a top plan view of a dust pan, made in accordance with my invention.

Fig. 2 is a front view, and

Fig. 3 is an end view.

Reference now being had to the details of the drawings by letter:

A designates a dust pan, preferably corrugate to reinforce and make the same rigid, and the sheet of metal from which the pan is made, it being understood that the pan is made of a single piece of metal, is bent downwardly at the rear portion of the pan to form a trough B, which may be of any shape, either rectangular in cross section or cylindrical, but in the present instance it is shown as being angular in cross section and having an inclined bottom C with inclined ends E through which latter the contents of the pan may be emptied conveniently. In forming the inclined ends with a trough, portions F of the side of the trough are bent in contact with each other and are soldered to the flanges H of the pan and serve as braces to reinforce the pan. The rear wall of the trough is provided with a handle N and has its upper edge forwardly bent and overhanging the rear portion of the trough forming a canopy for the same, provided for the purpose of directing the contents of the pan when it is tilted.

What I claim to be new is:

A dust pan made of a single sheet of material, a portion of which is bent at the rear to form a trough, with inclined ends projecting beyond the opposite ends of the pan, said ends having flanges integral at their rear ends with the side walls of the projecting portions of the trough, portions of the front wall of the trough being folded in contact with each other and soldered to the outer faces of said flanges forming reinforcing braces, a portion of the rear wall of the trough curved forwardly over the latter and terminating slight distances from the extreme ends of the trough.

In testimony whereof I hereunto affix my signature in presence of two witnesses.

CLARENCE A. OLSEN.

Witnesses:
A. S. STEPHENS, Jr.,
MAX W. NORTON.

Copies of this patent may be obtained for five cents each, by addressing the "Commissioner of Patents, Washington, D. C."